(12) United States Patent
Seo

(10) Patent No.: US 12,471,291 B2
(45) Date of Patent: Nov. 11, 2025

(54) SEMICONDUCTOR DEVICE AND METHOD FOR FABRICATING THE SAME

(71) Applicant: SK hynix Inc., Icheon-si (KR)

(72) Inventor: Soo Man Seo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 429 days.

(21) Appl. No.: 18/150,633

(22) Filed: Jan. 5, 2023

(65) Prior Publication Data

US 2024/0049474 A1 Feb. 8, 2024

(30) Foreign Application Priority Data

Aug. 5, 2022 (KR) .................. 10-2022-0097803

(51) Int. Cl.
*H10B 61/00* (2023.01)
(52) U.S. Cl.
CPC .................................. *H10B 61/10* (2023.02)
(58) Field of Classification Search
CPC ........ H10B 61/10; H10B 63/30; H10B 63/82; H10B 61/20; H10B 61/00; G11C 11/1655; G11C 11/1657; G11C 13/0004; G11C 13/0007; G11C 13/0023; G11C 13/0026; G11C 13/0028; G11C 13/003; G11C 13/0069; H10N 70/043; H10N 70/25; H10N 70/253; H10N 70/826; H10N 70/883; H10N 50/01; H10N 50/10; H10N 50/80
See application file for complete search history.

(56) References Cited

U.S. PATENT DOCUMENTS

| | | | |
|---|---|---|---|
| 7,738,279 B2 * | 6/2010 | Slesazeck | G11C 11/1673 365/104 |
| 8,125,006 B2 | 2/2012 | Gruening-von et al. | |
| 10,714,534 B1 * | 7/2020 | Bandyopadhyay | H10B 63/34 |
| 2021/0074766 A1 * | 3/2021 | Pillarisetty | G11C 13/0002 |
| 2023/0133638 A1 * | 5/2023 | Ha | H10B 61/10 438/382 |

* cited by examiner

*Primary Examiner* — Allison Bernstein
(74) *Attorney, Agent, or Firm* — Perkins Coie LLP

(57) ABSTRACT

A semiconductor device may include: a plurality of word lines extending in a first direction; a plurality of bit lines extending in a second direction, a plurality of memory cells disposed at intersections of the plurality of word lines and the plurality of bit lines, respectively, each memory cell structured to include a variable resistance element configured to store data by exhibiting different resistance values and a selection element connected to the variable resistance element in series to selectively connect or disconnect the variable resistance element to the pair of the corresponding bit line and word line; and a boosting line connected to a portion of the selection element that is between one end of the selection element, which is connected to one of the word line and the bit line, and another end of the selection element, which is connected to the variable resistance element.

27 Claims, 11 Drawing Sheets

SEMICONDUCTOR DEVICE AND METHOD FOR FABRICATING THE SAME

PRIORITY CLAIM AND CROSS-REFERENCE TO RELATED APPLICATION

This patent document claims priority under 35 U.S.C. § 119 to Korean Patent Application No. 10-2022-0097803 filed on Aug. 5, 2022, which is incorporated herein by reference in its entirety.

TECHNICAL FIELD

This patent document relates to memory circuits or devices and their applications in electronic devices or systems.

BACKGROUND

Recently, as electronic appliances trend toward miniaturization, low power consumption, high performance, multi-functionality, and so on, semiconductor devices capable of storing information in various electronic appliances such as a computer, a portable communication device, and so on have been demanded in the art, and research has been conducted for the semiconductor devices. Such semiconductor devices include semiconductor devices which can store data using a characteristic that they are switched between different resistant states according to an applied voltage or current, for example, an RRAM (resistive random access memory), a PRAM (phase change random access memory), an FRAM (ferroelectric random access memory), an MRAM (magnetic random access memory), an E-fuse, etc.

SUMMARY

In an embodiment, a semiconductor device may include: a plurality of word lines extending in a first direction; a plurality of bit lines spaced from the plurality of word lines and extending in a second direction that is different from the first direction; a plurality of memory cells disposed at intersections of the plurality of word lines and the plurality of bit lines, respectively, each memory cell being coupled between and electrically connected to a pair of a corresponding bit line and a corresponding word line that intersect at the memory cell and structured to include a variable resistance element configured to store data by exhibiting different resistance values and a selection element connected to the variable resistance element in series to selectively connect or disconnect the variable resistance element to the pair of the corresponding bit line and word line; and a boosting line connected to a portion of the selection element that is between one end of the selection element, which is connected to one of the word line and the bit line, and another end of the selection element, which is connected to the variable resistance element, wherein the boosting line supplies a boosting voltage to the selection element to reduce a voltage applied to the memory cell via the pair of the corresponding bit line and word line for operating the memory cell.

In an embodiment, a semiconductor device may include: a substrate; a plurality of word lines disposed over the substrate and extending in a first direction; a plurality of memory cells arranged in the first direction and overlapping each of the plurality of word lines, each memory cell including a selection element and a variable resistance element that are stacked in a vertical direction; a boosting line in contact with a portion of a side surface of the selection element; and a plurality of bit lines disposed over the memory cells and extending in a second direction intersecting the first direction.

In an embodiment, a method for fabricating a semiconductor device, may include: forming a plurality of word lines extending in a first direction, over a substrate; forming a plurality of selection elements arranged in the first direction to overlap each of the plurality of word lines; forming a boosting line in contact with a portion of a side surface of the selection element on one side of the selection element; forming a variable resistance element over the selection element; and forming a plurality of bit lines disposed over the variable resistance element and extending in a second direction intersecting the first direction.

DETAILED DESCRIPTION

Figure 1:
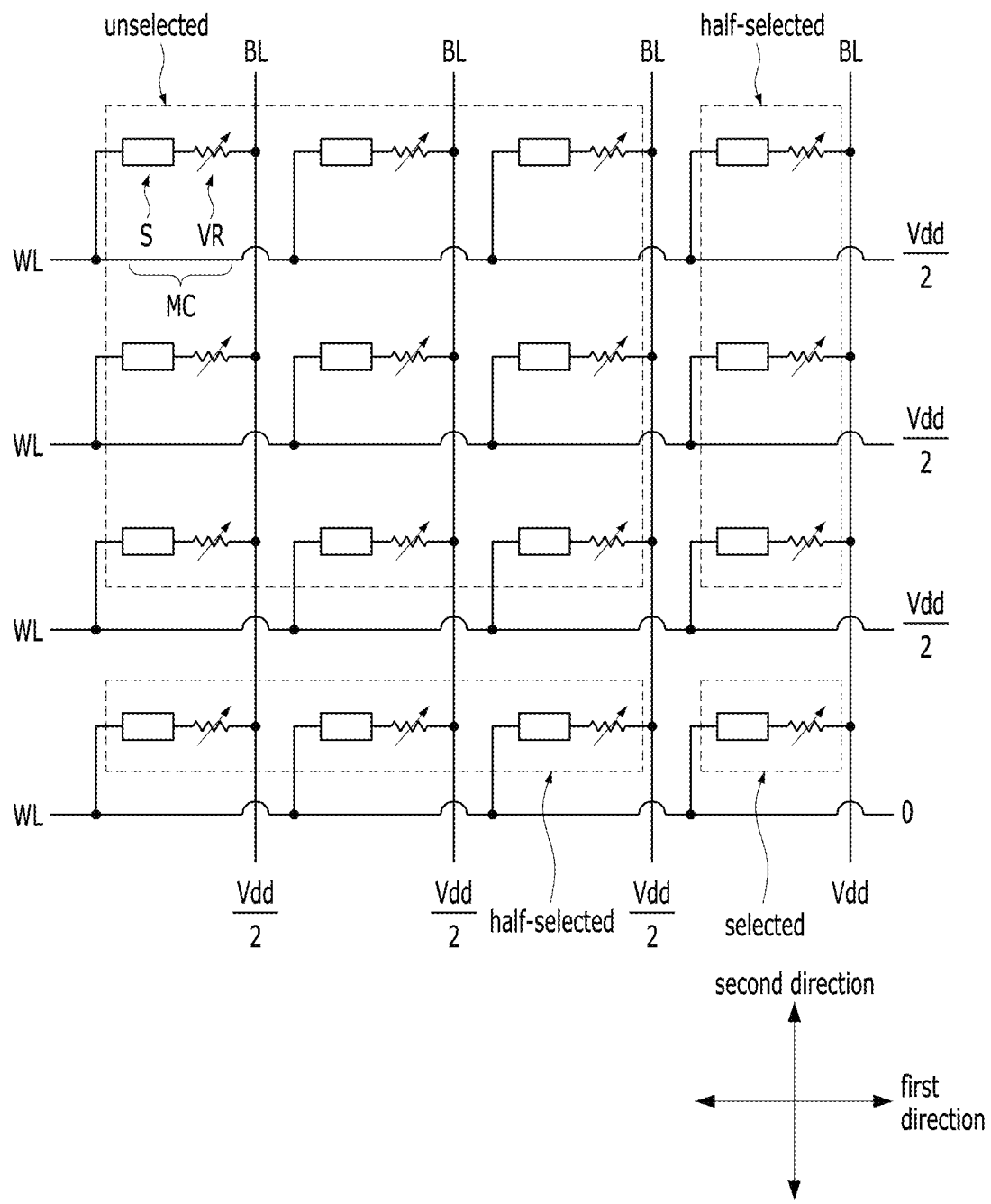
FIG. 1 is a circuit diagram illustrating a semiconductor device of a comparative example.

Hereinafter, various embodiments of the disclosure will be described in detail with reference to the accompanying drawings.

The drawings are not necessarily drawn to scale. In some instances, proportions of at least some structures in the drawings may have been exaggerated in order to clearly illustrate certain features of the described embodiments. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure might not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

FIG. 1 is a circuit diagram illustrating a semiconductor device of a comparative example.

Referring to FIG. 1, the semiconductor device of the comparative example may include a plurality of word lines WL extending in a first direction, a plurality of bit lines BL extending in a second direction intersecting the first direction, and a plurality of memory cells MC formed at intersection regions of the word lines WL and the bit lines BL, respectively.

Each of the plurality of memory cells MC may include a variable resistance element VR that exhibit different resistance values or states for storing data and a selection element S that is connected to the variable resistance element VR in series. The selection element S is structured to, in response to an applied electrical signal, either be electrically conductive in a turn-on state or substantially block a current flow in a turn-off state, thus selectively connecting the serially connected the variable resistance element VR to the corresponding intersecting word line WL and bit line BL. Although the present embodiment describes a case in which the variable resistance element VR is connected to the bit line BL and the selection element S is connected to the word line WL, the present disclosure is not limited thereto. The positions of the variable resistance element VR and the selection element S may be changed such that the variable resistance element VR is connected to the word line WL and the selection element S is connected to the bit line BL.

The variable resistance element VR may be a two-terminal element having one end connected to the bit line BL and the other end connected to the selection element S. The variable resistance element VR may be configured to store data in the memory cell MC. In some implementations, the variable resistance element VR may have a variable resistance characteristic that switches between different resistance states according to a voltage or current applied through both ends thereof. When the variable resistance element VR has a low resistance state, for example, data corresponding to a logic state '1' may be stored, and when the variable resistance element VR has a high resistance state, for example, data corresponding to a logic state '0' may be stored. Without being limited to the above example, other implementations are possible. For example, the variable resistance element VR can be implemented to store '0' and '1' in the low resistance state and the high resistance state, respectively.

The selection element S may be a two-terminal element having one end connected to the word line WL and the other end connected to the variable resistance element VR. The selection element S may function to prevent current leakage that may occur between the memory cells MC sharing the word line WL or the bit line BL. In some implementations, the selection element S may have a threshold switching characteristic in which the current flow is substantially blocked when an applied voltage is less than a predetermined threshold value, and the current flow rapidly increases when an applied voltage exceeds the predetermined threshold value. The threshold value may be referred to as a threshold voltage, and the selection element S may be implemented to operate in a turned-on state or a turned-off state based on the threshold voltage.

In order to write data to the variable resistance element VR of a selected memory cell MC among the plurality of memory cells MC or read data written thereto, the selection element S of the selected memory cell MC needs to be turned on to access the variable resistance element VR. A voltage applied to the selection element S, that is, a potential difference between both ends of the selection element S to turn on the selection element S, may be, for example, a power supply voltage Vdd. The power supply voltage Vdd may have a value equal to or greater than the threshold voltage of the selection element S. The power supply voltage Vdd may be supplied through the word line WL and the bit line BL to which the selected memory cell MC is connected. Accordingly, when the existence of the variable resistance element VR is neglected, a predetermined voltage may be applied to the word line WL and the bit line BL so that a potential difference between the word line WL and the bit line BL to which the selected memory cell MC is connected becomes the power supply voltage Vdd. As an example, a voltage of 0V may be applied to the word line WL to which the selected memory cell MC is connected, and the power supply voltage Vdd may be applied to the bit line BL to which the selected memory cell MC is connected. The selected memory cell MC is marked as 'selected' in the figure.

Leakage current may be prevented or reduced when the selection element S of each of remaining memory cells MC, except for the selected memory cell MC, is turned off. The remaining memory cells MC may be referred to as unselected memory cells MC. To prevent or reduce the current leakage, a potential difference between both ends of the selection element S of the unselected memory cell MC needs to be minimized. For example, a potential difference between both ends of the selection element S of the unselected memory cell MC may be set to 0V. Accordingly, except for the word line WL and the bit line BL to which the selected memory cell MC is connected, the same voltage may be applied to remaining word lines WL and remaining bit lines BL so that a potential difference between the remaining word lines WL and the remaining bit lines BL becomes 0V. For example, half of the power supply voltage Vdd, that is, a voltage of Vdd/2, may be applied to the remaining word lines WL and the remaining bit lines BL.

In this case, there may be substantially no potential difference between both ends of the selection element S of each of the unselected memory cells MC that do not share the word line WL and the bit line BL with the selected memory cell MC. Accordingly, the selection element S of the unselected memory cell MC may be substantially turned off. The unselected memory cell MC is marked as 'unselected' in the figure.

In this case, a potential difference corresponding to a voltage of Vdd/2 may occur at both ends of the selection element S of each of the unselected memory cells MC that share the word line WL or the bit line BL with the selected memory cell MC. The unselected memory cell MC sharing the word line WL or the bit line BL with the selected memory cell MC may be referred to as a half-selected memory cell MC, and is marked as 'half-selected' in the figure. For example, a voltage of Vdd/2 may be applied to the selection element S of the half-selected memory cell MC connected together to the word line WL to which the selected memory cell MC is connected. Similarly, a voltage Vdd/2 may also be applied to the selection element S of the half-selected memory cell MC connected together to the bit line BL to which the selected memory cell MC is connected.

In such a semiconductor device, as the number of memory cells MC increases and the area occupied by the memory cells MC relatively decreases due to the increase in the degree of integration, the threshold voltage distribution of the selection element S and the driving current of the variable resistance element VR increase. In order to reduce the threshold voltage distribution of the selection element S and satisfy the demand for increasing the driving current of the variable resistance element VR, it may be necessary to increase the level of the power supply voltage Vdd. However, an increase in the power supply voltage Vdd may cause a problem of increasing power consumption of the semiconductor device.

Some implementations of the disclosed technology suggest additionally forming a boosting line in the semiconductor device. With the boosting line, the semiconductor device can be driven at a voltage lower than the power supply voltage Vdd, which prevents or reduces the increase in power consumption, thus improving the power efficiency of the memory device. This will be described in more detail with reference to the drawings to be described later.

Figure 2:
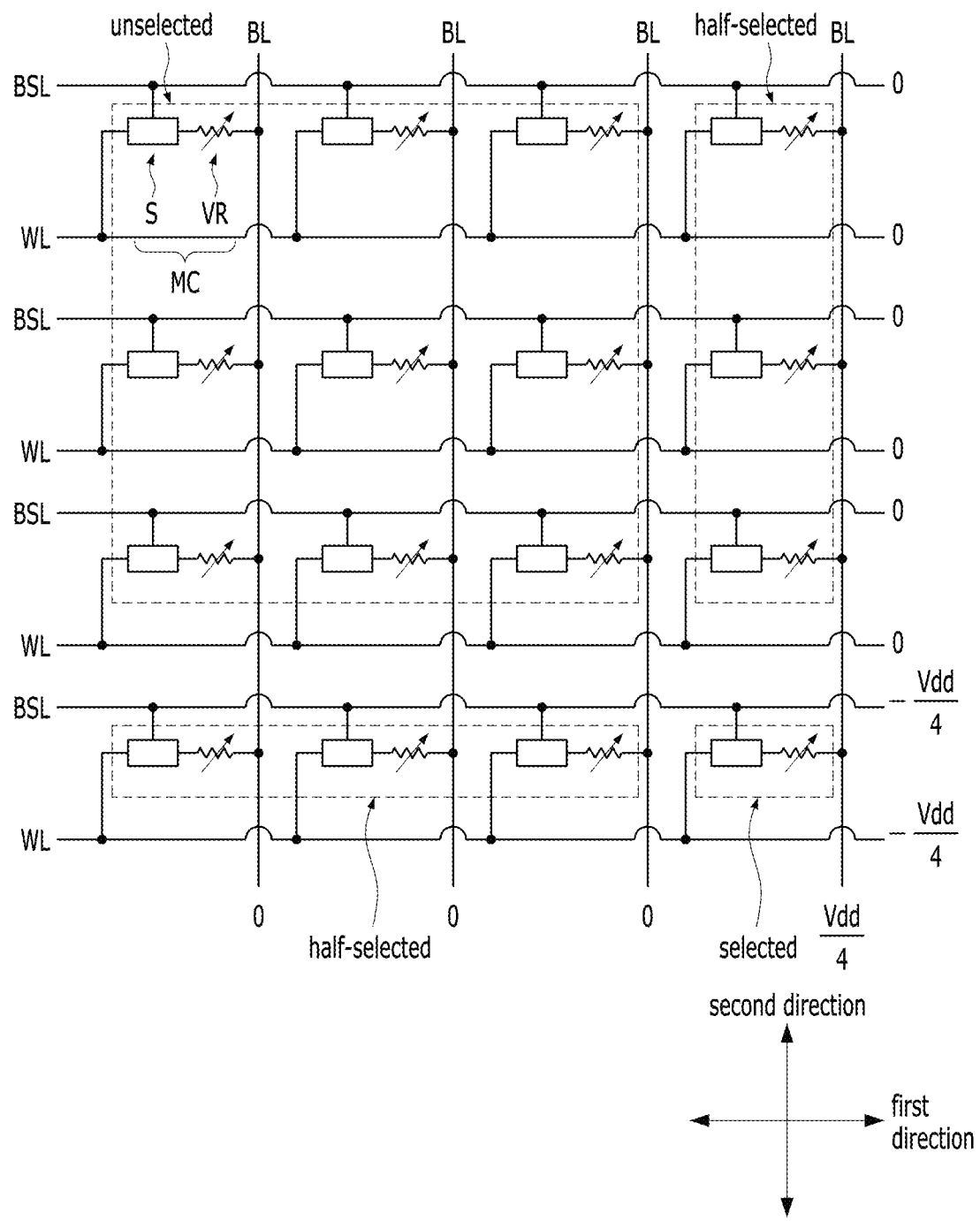
FIG. 2 is a circuit diagram illustrating a semiconductor device according to an embodiment of the present disclosure.

FIG. 2 is a circuit diagram illustrating a semiconductor device according to an embodiment of the present disclosure.

Referring to FIG. 2, the semiconductor device of the present embodiment may include a plurality of word lines WL extending in a first direction, a plurality of boosting lines BSL extending in the first direction and alternately arranged with the plurality of word lines WL, a plurality of bit lines BL extending in a second direction intersecting the first direction to cross the plurality of word lines WL and the plurality of boosting lines BSL, and a plurality of memory cells MC formed at each of intersection regions of the plurality of word lines WL, the plurality of boosting lines BSL, and the plurality of bit lines BL.

Each of the plurality of memory cells MC may include a variable resistance element VR and a selection element S connected in series.

The variable resistance element VR may be a two-terminal element having one end connected to the bit line BL and the other end connected to the selection element S, and may have a variable resistance characteristic.

The selection element S may be a two-terminal element having one end connected to the word line WL and the other end connected to the variable resistance element VR. The selection element S may be implemented to operate in a turned-on state in which current flows or a turned-off state in which current is substantially cut off based on a threshold voltage. This current flow of the selection element S may occur between one end and the other end of the selection element S.

At a position between one end and the other end of the selection element S, the selection element S may be electrically connected to the boosting line BSL. The boosting line BSL may extend in the same direction as the word line WL, for example, in the first direction, and thus may be commonly connected to a plurality of selection elements S arranged in the first direction. The plurality of selection elements S connected to the same word line WL may be connected to the same boosting line BSL. The boosting line BSL may function to increase a potential difference applied to the selection element S.

As a specific example, the boosting line BSL can be constructed and operated as follows. The turn-on voltage of the selection element S may be, for example, a power supply voltage Vdd. The power supply voltage Vdd may be supplied through a word line WL, a bit line BL, and a boosting line BSL to which the selected memory cell MC is connected. Here, when a potential difference between both ends of the selection element S of the selected memory cell MC, that is, a potential difference between the word line WL and the bit line BL to which the selected memory cell MC is connected when the existence of the variable resistance element VR is ignored, may be set to a value smaller than the power supply voltage Vdd. In the selected memory cell MC, even if a potential difference between the word line WL and the bit line BL is smaller than the power supply voltage Vdd, a potential difference between the boosting line BSL and the word line WL and a potential difference between the boosting line BSL and the bit line BL may compensate for this lower potential difference between the word line WL and the bit line BL to turn on the selection element S.

As an example, a voltage of −Vdd/4 may be applied to the word line WL to which the selected memory cell MC is connected, a voltage of Vdd/4 may be applied to the bit line BL to which the selected memory cell MC is connected, and a boosting voltage of −Vdd/4 may be applied to the boosting line BSL to which the selected memory cell MC is connected. In this case, a potential difference between the word line WL and the bit line BL to which the selected memory cell MC is connected may be a voltage of Vdd/2, a potential difference between the word line WL and the boosting line BSL to which the selected memory cell MC is connected may be 0V, and a potential difference between the bit line BL and the boosting line BSL to which the selected memory cell MC is connected may be a voltage of Vdd/2. As a result, a voltage corresponding to Vdd/2+0+Vdd/2, that is, a voltage of Vdd, may be applied to the selected memory cell MC to turn on the selection element S.

A voltage of 0V may be applied to the remaining word lines WL, bit lines BL, and boosting lines BSL, except for the word line WL, the bit line BL, and the boosting line BSL to which the selected memory cell MC is connected.

In this case, since a voltage of 0V is applied to the unselected memory cell MC that does not share the word line WL and the bit line BL with the selected memory cell MC, the selection element S of the unselected memory cell MC may be in a turned-off state.

For the half-selected memory cell MC sharing the word line WL with the selected memory cell MC, a potential difference between the word line WL and the bit line BL may be a voltage of Vdd/4, a potential difference between the word line WL and the boosting line BSL may be 0V, and a potential difference between the bit line BL and the boosting line BSL may be a voltage of Vdd/4. Accordingly, a voltage corresponding to Vdd/4+0+Vdd/4, that is, a voltage of Vdd/2 may be applied to the half-selected memory cell MC sharing the word line WL with the selected memory cell MC.

For the half-selected memory cell MC sharing the bit line BL with the selected memory cell MC, a potential difference between the word line WL and the bit line BL may be a voltage of Vdd/4, a potential difference between the word line WL and the boosting line BSL may be 0V, and a potential difference between the bit line BL and the boosting line BSL may be a voltage of Vdd/4. Accordingly, a voltage corresponding to Vdd/4+0+Vdd/4, that is, a voltage of Vdd/2 may be applied to the half-selected memory cell MC sharing the bit line BL with the selected memory cell MC.

According to the semiconductor device of the present embodiment described above, since a voltage smaller in magnitude than the power supply voltage Vdd, for example, a voltage of ±Vdd/4 is used, power consumption of the semiconductor device can be significantly reduced compared to the comparative example. Despite the reduction in power consumption, the voltages applied to the selected memory cell MC, the unselected memory cell MC, and the half-selected memory cell MC in the semiconductor device of the present embodiment are same as those in the comparative example. Thus, as in the comparative example, in the semiconductor device of the present embodiment, a voltage of Vdd may be applied to the selected memory cell MC, a voltage of 0V may be applied to the unselected memory cell MC, and a voltage of Vdd/2 may be applied to the half-selected memory cell MC.

Figure 3:
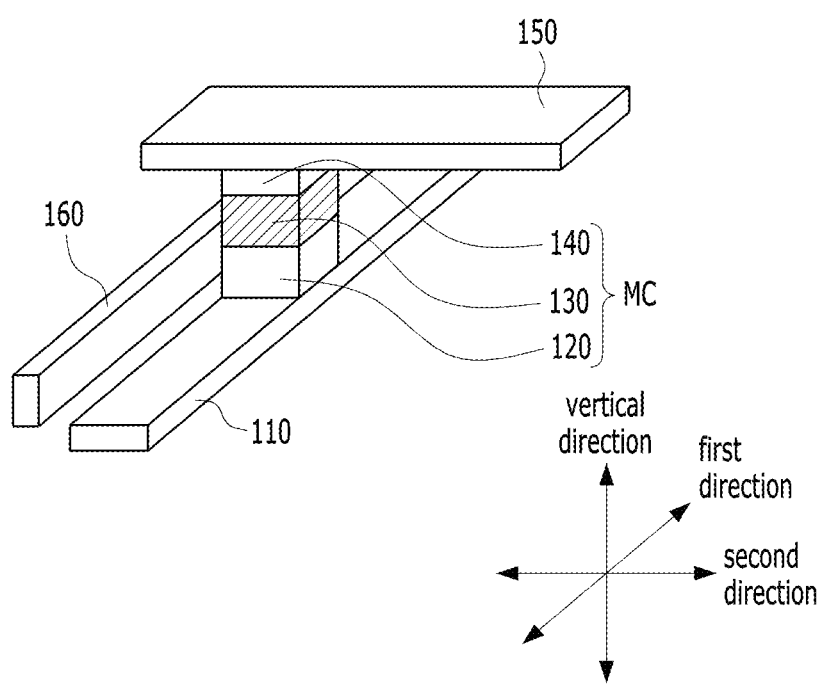
FIG. 3 is a perspective view illustrating a unit memory cell and a word line, a boosting line, and a bit line connected to the unit memory cell according to an embodiment of the present disclosure.

FIG. 3 is a perspective view illustrating a unit memory cell and a word line, a boosting line, and a bit line connected to the unit memory cell according to an embodiment of the present disclosure. As an example, the memory cell of FIG. 3 may correspond to any one of the memory cells of FIG. 2.

Referring to FIG. 3, a word line 110 extending in a first direction may be disposed over a substrate (not shown) in which a predetermined lower structure is formed.

A bit line 150 may be disposed over the word line 110 to be spaced apart from the word line 110 in a vertical direction and extend in a second direction intersecting the first direction. The first direction and the second direction may be a horizontal direction substantially perpendicular to the vertical direction.

The word line 110 and the bit line 150 may be formed of or include various conductive materials, for example, a metal such as platinum (Pt), tungsten (W), aluminum (Al), copper (Cu), or tantalum (Ta), a metal nitride such as titanium nitride (TiN) or tantalum nitride (TaN), or a combination thereof, and may have a single-layer structure or a multi-layer structure.

A memory cell MC having a pillar shape may be disposed between the word line 110 and the bit line 150 while overlapping the intersecting region thereof. In the present embodiment, the memory cell MC may have a rectangular shape in a plan view. Both sidewalls of the memory cell MC may be aligned with both sidewalls of the bit line 150 in the first direction, and both sidewalls of the memory cell MC may be aligned with both sidewalls of the word line 110 in the second direction. However, the present disclosure is not limited thereto, and as long as the memory cell MC has a pillar shape and is separated from the adjacent memory cell MC, the planar shape thereof may be variously deformed into a circular shape, an elliptical shape, or others.

The memory cell MC may have a single-layer structure or a multi-layer structure that functions to store data. As an example, the memory cell MC may include a variable resistance element that stores different data by exhibiting different resistance values corresponding to different resistance states. The resistance state of the variable resistance element is switched between different resistance states according to a voltage or current applied through its lower end connected to the word line 110 and its upper end connected to the bit line 150. In an example, the memory cell MC may have a multi-layer structure including a selection element layer 120, an electrode layer 130, and a variable resistance layer 140.

The electrode layer 130 may be interposed between the selection element layer 120 and the variable resistance layer 140 to electrically connect the selection element layer 120 and the variable resistance layer 140 to each other while physically separating the selection element layer 120 and the variable resistance layer 140 from each other. The electrode layer 130 may include various conductive materials, for example, a metal such as platinum (Pt), tungsten (W), aluminum (Al), copper (Cu), or tantalum (Ta), a metal nitride such as titanium nitride (TiN) or tantalum nitride (TaN), or a combination thereof. In some implementations, the electrode layer 130 may include a carbon electrode.

The selection element layer 120 may function to prevent current leakage that may occur between the memory cells MC sharing the word line 110 or the bit line 150. In some implementations, the selection element layer 120 may have a threshold switching characteristic in which current flow is substantially blocked when the applied voltage is less than a predetermined threshold value, and current flow rapidly increases when the applied voltage is exceeds a predetermined threshold value. This threshold value may be referred to as a threshold voltage, and the selection element layer 120 may be implemented in a turned-on state, or a turned-off state based on the threshold voltage. For example, the selection element layer 120 may be turned on to be electrically conductive to allow the current to flow through when the magnitude of the applied voltage is greater than the threshold value and may be turned off to block or substantially limit current when the magnitude of the applied voltage is less than the threshold value. The selection element layer 120 may include a diode, an ovonic threshold switching (OTS) material such as a chalcogenide-based material, a mixed ionic electronic conducting (MIEC) material such as a metal-containing chalcogenide-based material, a metal insulator transition (MIT) material such as $NbO_2$ or $VO_2$, a tunneling insulating layer having a relatively wide band gap, such as $SiO_2$ or $Al_2O_3$, or others.

Figure 4:
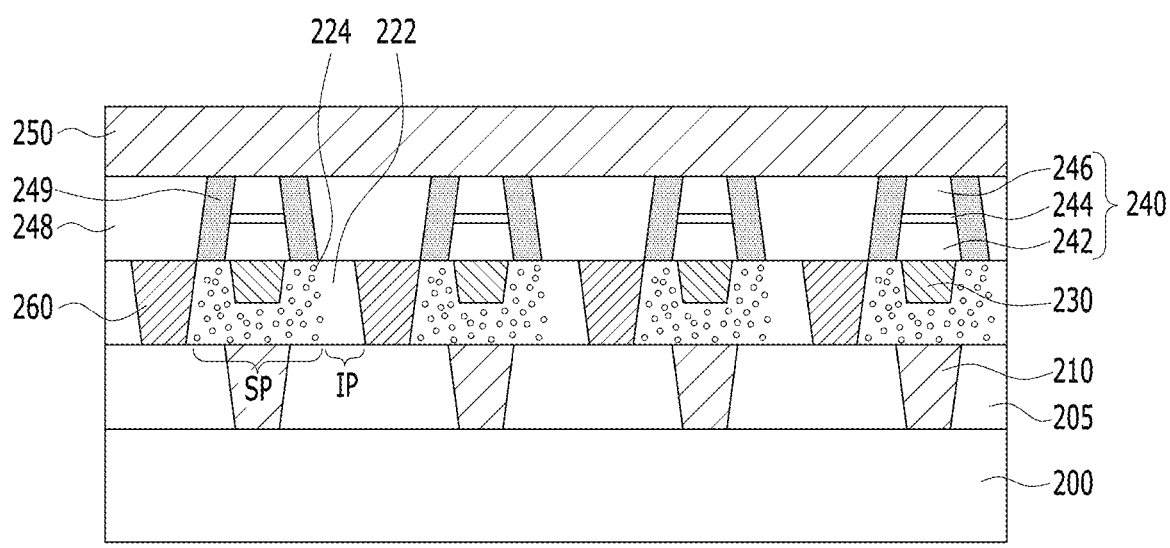
FIG. 4 is a cross-sectional view illustrating a semiconductor device according to an embodiment of the present disclosure, and a method for fabricating the same.

The variable resistance layer 140 may function together with other parts of the memory cell MC to store data in the memory cell MC. In some implementations, the variable resistance layer 140 may have a variable resistance characteristic that exhibit different resistance values corresponding to different resistance states that are switched according to an applied voltage. The variable resistance layer 140 may have a single-layer structure or a multi-layer structure including various materials used in RRAM, PRAM, FRAM, MRAM, or others, for example, a metal oxide such as a transition metal oxide or a perovskite-based material, a phase change material such as a chalcogenide-based material, a ferroelectric material, a ferromagnetic material, or others. In particular, the variable resistance layer 140 of the present embodiment may include a magnetic tunnel junction (MTJ) structure as shown in FIG. 4 to be described later. The MTJ structure will be described in more detail later in this patent document.

However, the present disclosure is not limited to the illustrated memory cell MC. In the memory cell MC, the stacking order of the layers may be changed, at least one layer of the layers may be omitted, or another layer may be added. In an example, the electrode layer 130 may be omitted. In an example, the positions of the selection element layer 120 and the variable resistance layer 140 may be reversed with each other. In an example, another electrode layer (not shown) may be further interposed between the selection element layer 120 and the word line 110 and/or between the variable resistance layer 140 and the bit line 150.

The boosting line 160 may be formed to extend in one direction while contacting at least a portion of a side surface of the selection element layer 120. In the present embodiment, the boosting line 160 may extend in the first direction while contacting any one of both sides of the selection element layer 120 in the second direction, for example, the left side. However, the present disclosure is not limited thereto, and as long as the boosting line 160 contacts the side surface of the selection element layer 120, it may extend in various horizontal directions. The boosting line 160 may extend in a direction that is not parallel to the word line 110 and intersects the word line 110. For example, the boosting line 160 may extend in the same second direction as the bit line 150. The boosting line 160 may be electrically insulated from other components except for the selection element layer 120. For example, the boosting line 160 may not contact the word line 110, the electrode layer 130, the variable resistance layer 140, or others. In some implementations, the position and/or thickness of the boosting line 160 in the vertical direction may be appropriately adjusted. For example, in the vertical direction, the upper surface of the boosting line 160 may be located at a level lower than or equal to the upper surface of the selection element layer 120, and the lower surface of the boosting line 160 may be located at a level higher than or equal to the lower surface of the selection element layer 120.

A voltage corresponding to a sum of a potential difference between the boosting line 160 and the word line 110, a potential difference between the boosting line 160 and the bit line 150, and a potential difference between the word line 110 and the bit line 150 may be applied to the memory cell MC.

FIG. 4 is a cross-sectional view illustrating a semiconductor device according to an embodiment of the present disclosure, and a method for fabricating the same. As an example, a cross-sectional view of FIG. 4 illustrates the memory cells MC arranged in the second direction in the semiconductor device of FIG. 2 and the word lines WL, the boosting lines BSL, and the bit lines BL connected thereto.

Referring to FIG. 4, a substrate 200 may be provided. The substrate 200 may include a semiconductor material such as silicon, and may include a desired lower structure (not shown). For example, the substrate 200 may include a driving circuit for controlling word lines 210, bit lines 250, boosting lines 260, or others, which are to be described later.

A plurality of word lines 210 may be arranged to be spaced apart from each other over the substrate 200. The plurality of word lines 210 may extend in a direction passing through the cross-section of this figure, for example, in a first direction. A space between the plurality of word lines 210 may be filled with a first interlayer insulating layer 205. The word lines 210 and the first interlayer insulating layer 205 may be formed by forming an insulating material for forming the first interlayer insulating layer 205 over the substrate 200, selectively etching the first interlayer insulating layer 205 to form line-type trenches providing spaces for the word lines 210 to be formed, and filling the trenches with a conductive material. In this case, the word line 210 may have a shape that becomes narrower from top to bottom. However, the present disclosure is not limited thereto. In another embodiment, the word lines 210 and the first interlayer insulating layer 205 may be formed by forming a conductive material over the substrate 200, selectively etching the conductive material to form the word lines 210, and filling a space between the word lines 210 with an insulating material to form the first interlayer insulating layer 205.

An insulating layer 222, an electrode layer 230, and a boosting line 260 may be disposed over the word lines 210 and the first interlayer insulating layer 205. Here, the insulating layer 222 may include a portion doped with a dopant 224 and a portion not doped with the dopant 224. The portion of the insulating layer 222, that is doped with the dopant 224, may function as a selection element, so it may be referred to as a selection element portion SP. The portion of the insulating layer 222, that is not doped with the dopant 224, retains its original insulating function, so it may be referred to as an insulating portion IP.

The insulating layer 222 may include a silicon-containing insulating material such as silicon oxide, silicon nitride, or silicon oxynitride, insulating metal oxide, insulating metal nitride, or a combination thereof. The dopant 224 may serve to create trap sites that trap conductive carriers migrating within the insulating layer 222 or provide a path for the trapped conductive carriers to migrate again. To form the trap sites, various elements capable of generating an energy level accommodating conductive carriers in the insulating layer 222 may be used as the dopant 224. For example, when the insulating layer 222 contains silicon, the dopant 224 may include a metal having a valence different from that of silicon. Alternatively, when the insulating layer 222 contains a metal, the dopant 224 may include a metal having a valence different from that of the metal, silicon, or others. For example, when the insulating layer 222 contains silicon, the dopant 224 may include gallium (Ga), boron (B), indium (In), phosphorus (P), arsenic (As), antimony (Sb), germanium. (Ge), carbon (C), tungsten (W), or a combination thereof. As an example, the selection element portion SP may include silicon oxide ($SiO_2$) doped with arsenic (As).

When a voltage equal to or greater than the threshold voltage is applied to the selection element portion SP, an on-state in which current flows through the selection element portion SP may be implemented by movement of conductive carriers through the trap sites. On the other hand, when a voltage applied to the selection element portion SP is reduced to less than the threshold voltage, an off-state in which current does not flow may be implemented because conductive carriers do not move.

The arrangement and shape of the insulating layer 222, the electrode layer 230, and the boosting line 260 will be discussed while explaining the fabricating method of these components of FIGS. 5A to 9B.

FIGS. 5A to 9B are views illustrating a method for fabricating a part of the semiconductor device of FIG. 4. FIGS. 5A, 6A, 7A, 8A, and 9A are cross-sectional views, and FIGS. 5B, 6B, 7B, 8B, and 9B are plan views of FIGS. 5A, 6A, 7A, 8A, and 9A viewed from above, respectively.

Figure 5A:
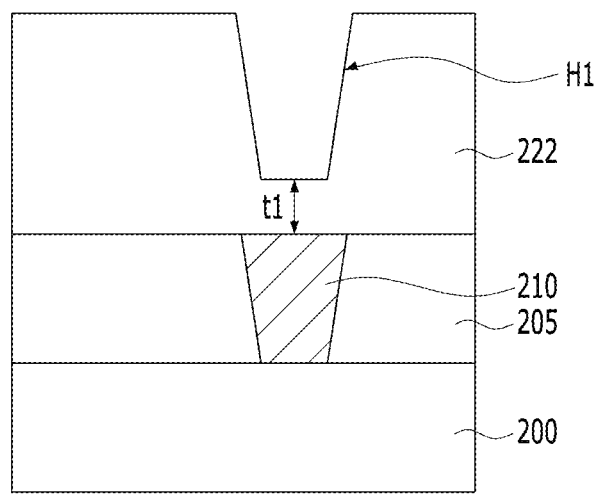
FIGS. 5A to 9B are views illustrating a method for fabricating a part of the semiconductor device of FIG. 4.
Figure 5B:
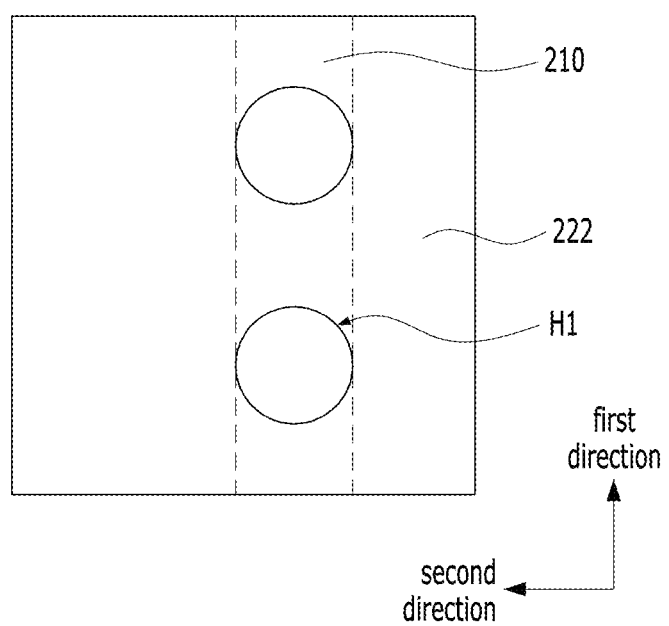

Referring to FIGS. 5A and 5B, after depositing the insulating layer 222 over the word line 210 and the first interlayer insulating layer 205, the insulating layer 222 may be selectively etched to a predetermined depth to form a hole H1.

The etch depth of the insulating layer 222 for forming the hole H1 may be smaller than the thickness of the insulating layer 222. Accordingly, the insulating layer 222 may remain under the hole H1 with a predetermined thickness (refer to t1). For convenience of description, a portion of the insulating layer 222 overlapping the hole H1 thereunder and having the thickness of t1 will be hereinafter referred to as a first portion, and the rest of the insulating layer 222, except for the first portion, will be hereinafter referred to as a second portion. A plurality of holes H1 may be arranged along the first direction in which the word line 210 extends while overlapping the word line 210. The plurality of holes H1 may have an island shape in a plan view. In the present embodiment, the hole H1 is illustrated as having a circular shape in a plan view, but the present disclosure is not limited thereto. The plane shape of the hole H1 may be variously modified.

Figure 6A:
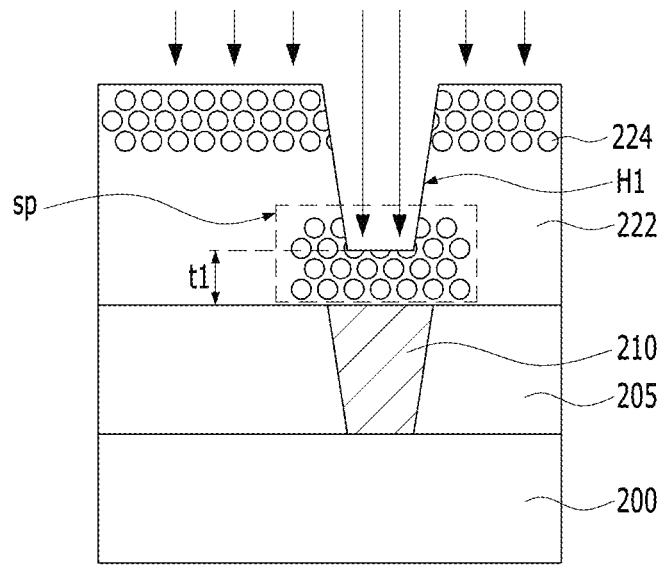
Figure 6B:
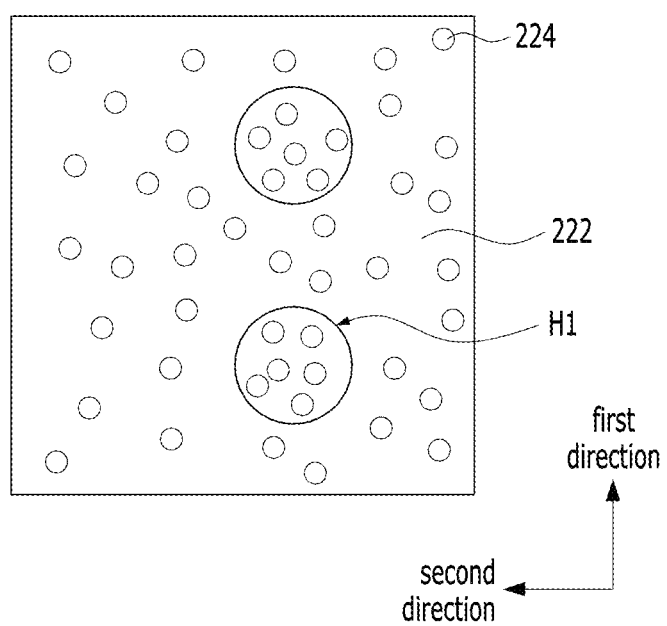

Referring to FIGS. 6A and 6B, the insulating layer 222 may be doped with the dopant 224 (see arrows).

Doping of the dopant 224 may be performed in a manner such as ion implantation, and may be performed in a direction toward the upper surface of the insulating layer 222, for example, in a direction from top to bottom. In addition, doping of the dopant 224 may be performed to a depth at which the dopant 224 is doped in all of the first portion of the insulating layer 222 having the thickness t1, and to a depth at which the dopant 224 is not doped in all of the second portion of the insulating layer 222.

As a result of this process, all of the first portion of the insulating layer 222 having the thickness t1 may include the dopant 224, but the second portion of the insulating layer 222 may include the dopant 224 only in its upper portion. The upper portion of the second portion of the insulating layer 222 may be positioned above the lower surface of the hole H1.

Since the dopant 224 is inevitably diffused to some extent in the doping process or heat treatment process for activation, the dopant 224 may be present not only in the first portion of the insulating layer 222 but also in the vicinity thereof to form the selection element portion SP. Referring to FIG. 6A, the uppermost surface of the selection element portion SP may be positioned below the upper portion of the second portion of the insulating layer 222 and positioned above the lower surface of the hole H1. In addition, referring to FIG. 7B, which will be described later, the selection element portion SP may have a larger width than the hole H1 in a plan view, and thus the side surface of the selection element portion SP may surround the side surface of the hole H1.

Figure 7A:
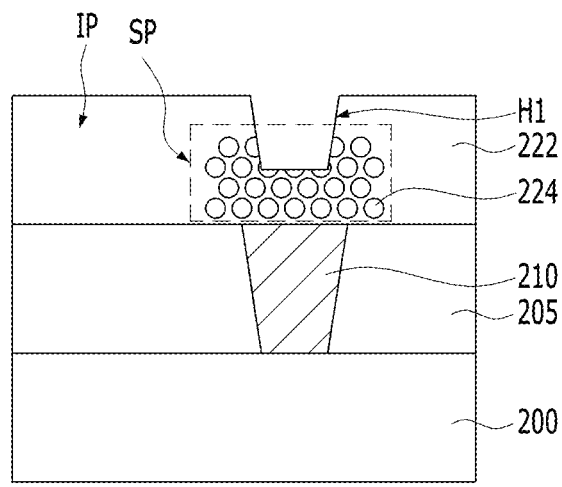
Figure 7B:
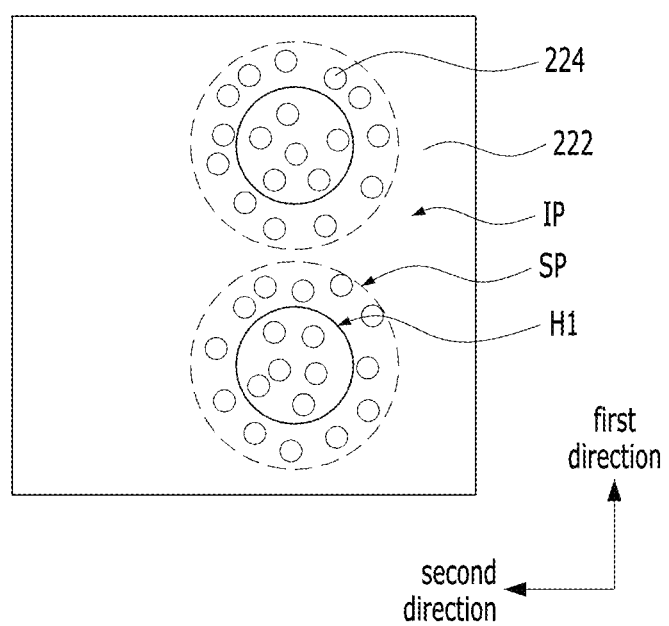

Referring to FIGS. 7A and 7B, the upper portion of the second portion of the insulating layer 222 doped with the dopant 224 may be removed. The removal process may be performed by a polishing process such as chemical mechanical polishing (CMP), an etch back process, or others.

As a result, the insulating layer 222 may include the selection element portion SP including a portion under the hole H1 and the vicinity thereof, and the insulating portion IP corresponding to the rest of the selection element portion SP. The selection element portion SP may include the insulating layer 222 doped with the dopant 224, and the insulating portion IP may include the insulating layer 222.

The selection element portion SP may have an island shape, and may be insulated and separated from the adjacent selection element portion SP by being surrounded by the insulating portion IP. Referring to this figure, a plurality of selection element portions SP may be separated from each other by the insulating portion IP while being arranged along the first direction. Furthermore, referring to FIG. 4, the plurality of selection element portions SP may be separated from each other by the insulating portion IP while being arranged in the second direction crossing the first direction.

The selection element portion SP may come in contact with the upper end of the word line 210 and be electrically connected thereto. However, the present disclosure is not limited thereto, and another conductive pattern such as a contact plug (not shown) may be further interposed between the word line 210 and the selection element portion SP to connect them.

Figure 8A:
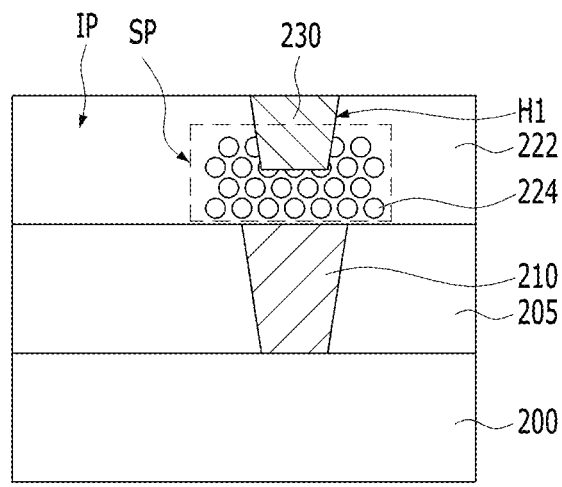
Figure 8B:
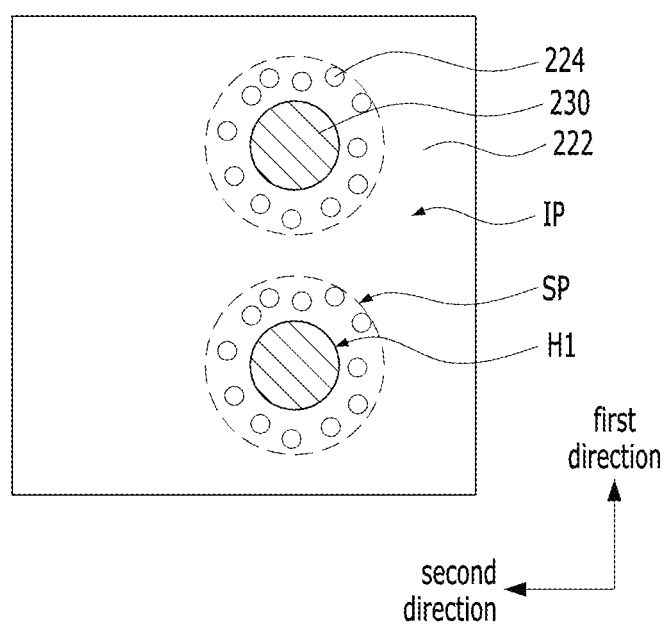

Referring to FIGS. 8A and 8B, the electrode layer 230 may be formed by filling a conductive material in the hole H1.

The electrode layer 230 may be formed by depositing a conductive material having a thickness sufficient to fill the hole H over the process resultant of FIGS. 7A and 7B, and then performing a planarization process until the upper surface of the insulating layer 222 is exposed.

The electrode layer 230 may have a substantially flat upper surface with the insulating layer 222, and may have a shape in which at least a portion of its side surface and its lower surface are surrounded by the selection element portion SP.

Figure 9A:
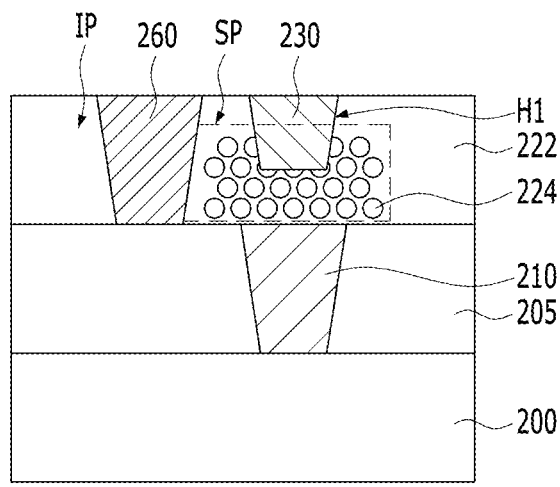
Figure 9B:
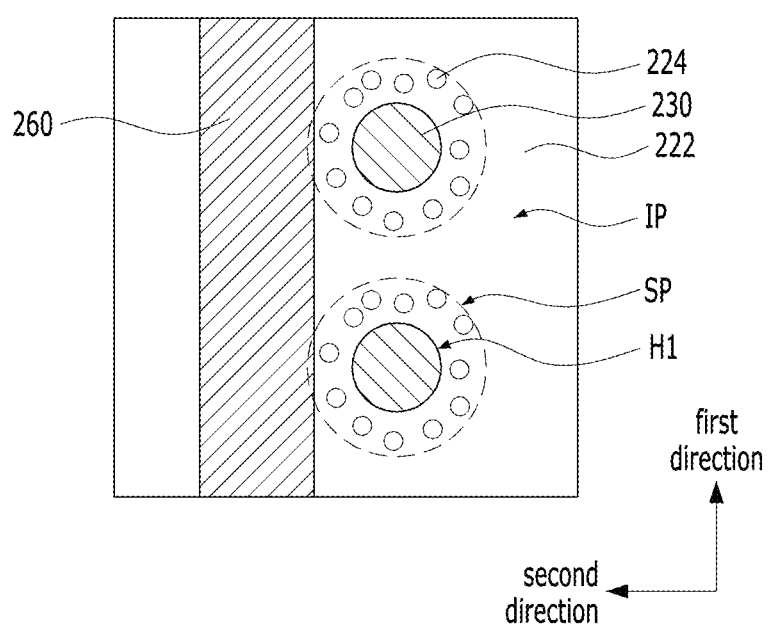

Referring to FIGS. 9A and 9B, the boosting line 260 extending in one direction while contacting the side surface of the selection element portion SP may be formed in the insulating layer 222.

The boosting line 260 may be formed by selectively etching the insulating layer 222 to form a line-type trench exposing the side surface of the selection element portion SP, and filling the trench with a conductive material. Accordingly, the boosting line 260 may have a shape that becomes narrower from top to bottom.

In the present embodiment, the boosting line 260 may extend in the same first direction as the word line 210 while in contact with the left surface of the selection element portion SP. Also, in the present embodiment, the boosting line 260 may pass through the insulating layer 222 to have substantially the same thickness as the insulating layer 222. However, in another embodiment, the thickness of the boosting line 260 may be adjusted to be less than that of the insulating layer 222. In this case, since the boosting line 260 is located above the word line 210, it may be possible to secure a separation distance from the word line 210. However, the present disclosure is not limited thereto, and as long as the boosting line 260 extends in one direction and is in contact with at least a portion of the side surface of the selection element portion SP while being electrically insulated from the word line 210, the contact portion with the side surface of the selection element portion SP, the extension direction, the thickness, or others may be variously modified.

Referring again to FIG. 4, a variable resistance element 240 may be formed over the insulating layer 222, the boosting line 260, and the electrode layer 230.

A plurality of variable resistance elements 240 may be arranged to overlap and connect to the plurality of electrode layers 230, respectively. Accordingly, the plurality of variable resistance elements 240 may be arranged in a matrix form along the first direction and the second direction. Also, the plurality of variable resistance elements 240 may have a pillar shape so that adjacent ones are separated from each other.

Each of the plurality of variable resistance elements 240 may store different data by switching between different resistance states according to a voltage or current applied through the lower end connected to the word line 210 and the upper end connected to the bit line 250 with the selection element portion SP and the electrode layer 230 interposed therebetween. As an example, the variable resistance element 240 may include an MTJ structure.

When the variable resistance element 240 includes the MTJ structure, the variable resistance element 240 may include a free layer 242 having a changeable magnetization direction, a pinned layer 246 having a fixed magnetization direction, and a tunnel barrier layer 244 interposed between the free layer 242 and the pinned layer 246.

Since the free layer 242 has a changeable magnetization direction, it can store different data according to the magnetization direction. For this reason, the free layer 242 may be referred to as a storage layer or others. The change in the magnetization direction in the free layer 242 may be due to a spin transfer torque. The free layer 242 may have a magnetization direction substantially perpendicular to the surface of the layer. For example, the magnetization direction of the free layer 242 may be changed between a top-down direction and a bottom-up direction. However, the present disclosure is not limited thereto, and the free layer 242 may have a magnetization direction substantially parallel to the surface of the layer.

Since the pinned layer 246 has a fixed magnetization direction, the magnetization of the pinned layer 246 may be contrasted with the magnetization direction of the free layer 242. For this reason, the pinned layer 246 may be referred to as a reference layer or others. When the free layer 242 has a magnetization direction substantially perpendicular to the surface of the layer, the pinned layer 246 may also have a magnetization direction substantially perpendicular to the surface of the layer. For example, the magnetization direction of the pinned layer 246 may be fixed in a bottom-up direction or a top-down direction. However, the present disclosure is not limited thereto, and when the free layer 242 has a magnetization direction substantially parallel to the surface of the layer, the pinned layer 246 may also have a magnetization direction substantially parallel to the surface of the layer.

The tunnel barrier layer 244 may enable tunneling of electrons between the free layer 242 and the pinned layer 246 according to a voltage or current applied through the upper end and the lower end of the MJT structure, thereby changing the magnetization direction of the free layer 242.

Each of the free layer 242 and the pinned layer 246 may have a single-layer structure or a multi-layer structure including a ferromagnetic material. As an example, each of the free layer 242 and the pinned layer 246 may include an alloy containing Fe, Ni, or Co as a main component, such as a Co—Fe—B alloy, a Co—Fe—B—X alloy, where X is Al, Si, Ti, V, Cr, Ni, Ga, Ge, Zr, Nb, Mo, Pd, Ag, Hf, Ta, W or Pt, Fe—Pt alloy, Fe—Pd alloy, Co—Pd alloy, Co—Pt alloy, Fe—Ni—Pt alloy, Co—Fe—Pt alloy, Co—Ni—Pt alloy, or others. Alternatively, each of the free layer 242 and the pinned layer 246 may include a stacked structure such as Co/Pt, Co/Pd, or others, or an alternate stacked structure of a magnetic material and a non-magnetic material. The tunnel barrier layer 244 may include an insulating oxide, for example, an oxide such as MgO, CaO, SrO, TiO, VO, or NbO.

In the MTJ structure described above, the magnetization direction of the free layer 242 may be changed according to an applied voltage or current, so that different data can be stored. When the magnetization directions of the free layer 242 and the pinned layer 246 are parallel to each other, the MTJ structure may be in a low resistance state, and may store data '1'. Conversely, when the magnetization direction of the free layer 242 and the magnetization direction of the pinned layer 246 are antiparallel to each other, the MTJ structure may be in a high resistance state, and may store data '0'.

A spacer 249 including various insulating materials may be formed over the sidewall of the variable resistance element 240 to protect the variable resistance element 240. A space between the variable resistance elements 240 with the spacer 249 may be filled with a second interlayer insulating layer 248.

A bit line 250 extending in the second direction while being connected to the upper end of the variable resistance element 240 may be disposed over the variable resistance element 240 and the second interlayer insulating layer 248. In the present embodiment, the bit line 250 directly contacts the upper end of the variable resistance element 240, but the present disclosure is not limited thereto, and a contact plug (not shown) may be disposed between the bit line 250 and the variable resistance element 240 to connect them.

Meanwhile, in the above embodiment, a case in which one boosting line BSL is disposed on one side of the selection element S and is connected to the selection element S has been described, but the present disclosure is not limited thereto. In another embodiment, two boosting lines BSL may be disposed on both sides of the selection element S to be connected to the selection element S. In this case, the semiconductor device may be driven using a smaller voltage than in the case of the above embodiment. This will be described with reference to FIGS. 10 and 11.

Figure 10:
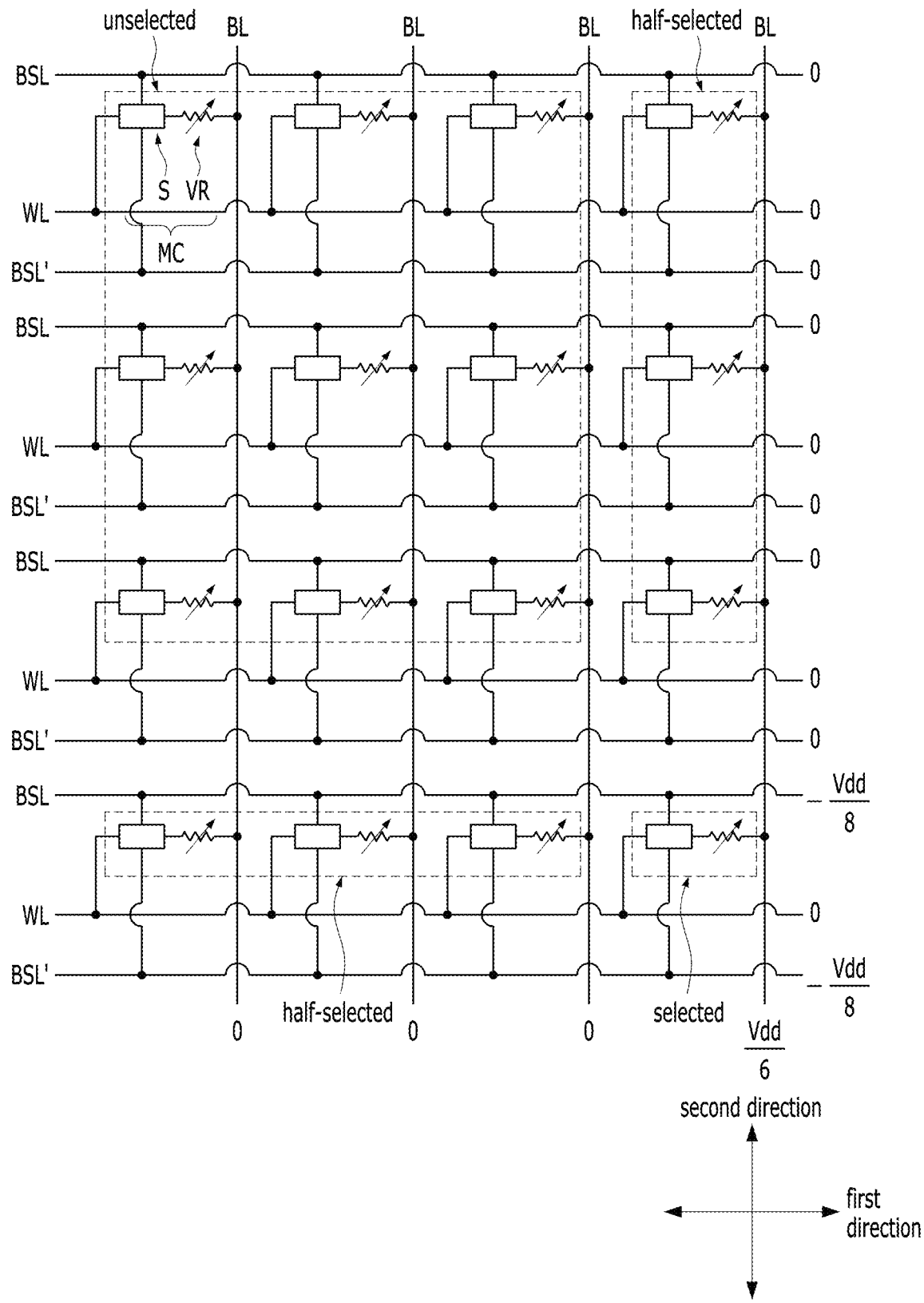
FIG. 10 is a circuit diagram illustrating a semiconductor device according to another embodiment of the present disclosure.

FIG. 10 is a circuit diagram illustrating a semiconductor device according to another embodiment of the present disclosure. Parts substantially identical to those of the above-described embodiments will be described using the same reference numerals, and detailed descriptions thereof will be omitted.

Referring to FIG. 10, the semiconductor device of the present embodiment may include a plurality of word lines WL extending in a first direction, a boosting line BSL and an additional boosting line BSL' extending in the first direction and positioned at both sides of each of the plurality of word lines WL, a plurality of bit lines BL extending in a second direction intersecting the first direction to cross the word line WL, the boosting line BSL, and the additional boosting line BSL', and a plurality of memory cells MC formed at intersections of the word lines WL, the boosting lines BSL, the additional boosting lines BSL', and the bit lines BL, respectively.

Each of the plurality of memory cells MC may include a variable resistance element VR and a selection element S connected in series.

A portion between one end and the other end of the selection element S may be electrically connected to the boosting line BSL, and another portion between one end and the other end of the selection element S may be electrically connected to the additional boosting line BSL'. Since the boosting line BSL and the additional boosting line BSL' are parallel to each other, the additional boosting line BSL' may be positioned on the opposite side of the boosting line BSL with respect to the selection element S. The boosting line BSL and the additional boosting line BSL' may function to increase a potential difference applied to the selection element S. More specifically, it is as follows.

The turn-on voltage of the selection element S may be, for example, a power supply voltage Vdd. The power supply voltage Vdd may be supplied through the word line WL, the bit line BL, the boosting line BSL, and the additional boosting line BSL' to which the selected memory cell MC is connected.

As an example, a voltage of 0V may be applied to the word line WL to which the selected memory cell MC is connected, a voltage of Vdd/6 may be applied to the bit line BL to which the selected memory cell MC is connected, a voltage of −Vdd/8 may be applied to the boosting line BSL to which the selected memory cell MC is connected, and a voltage of −Vdd/8 may be applied to the additional boosting line BSL' to which the selected memory cell MC is connected. In this case, a potential difference between the word line WL and the boosting line BSL to which the selected memory cell MC is connected may become a voltage of Vdd/8, a potential difference between the word line WL and the additional boosting line BSL' to which the selected memory cell MC is connected may become a voltage of Vdd/8, a potential difference between the word line WL and the bit line BL to which the selected memory cell MC is connected may become a voltage of Vdd/6, a potential difference between the boosting line BSL and the additional boosting line BSL' to which the selected memory cell MC is connected may become a voltage of 0V, a potential difference between the bit line BL and the boosting line BSL to which the selected memory cell MC is connected may become a voltage of 7 Vdd/24 voltage, and a potential difference between the bit line BL and the additional boosting line BSL' to which the selected memory cell MC is connected may become a voltage of 7 Vdd/24. As a result, a voltage corresponding to Vdd/8+Vdd/8+Vdd/6+0+7 Vdd/

24+7 Vdd/24, that is, a voltage of Vdd, may be applied to the selected memory cell MC so that the selection element S is turned on.

A voltage of 0V may be applied to the remaining word lines WL, bit lines BL, boosting lines BSL, and additional boosting lines BSL', except for the word line WL, the bit line BL, the boosting line BSL, and the additional boosting line BSL' to which the selected memory cell MC is connected.

In this case, since a voltage of 0V is applied to the unselected memory cell MC, the selection element S of the unselected memory cell MC may be in a turned-off state.

For the half-selected memory cell MC sharing the word line WL with the selected memory cell MC, a potential difference between the word line WL and the boosting line BSL may become a voltage of Vdd/8, a potential difference between the word line WL and the additional boosting line BSL' may become a voltage of Vdd/8, a potential difference between the word line WL and the bit line BL may become a voltage of 0V, a potential difference between the boosting line BSL and the additional boosting line BSL' may become a voltage of 0V, a potential difference between the bit line BL and the boosting line BSL may become a voltage of Vdd/8, and a potential difference between the bit line BL and the additional boosting line BSL' may become a voltage of Vdd/8. As a result, a voltage corresponding to Vdd/8+Vdd/8+0+0+Vdd/8+Vdd/8, that is, a voltage corresponding to Vdd/2 may be applied to the selection element S of the half-selected memory cell MC sharing the word line WL with the selected memory cell MC.

For the half-selected memory cell MC sharing the bit line BL with the selected memory cell MC, a potential difference between the word line WL and the boosting line BSL may become a voltage of 0V, a potential difference between the word line WL and the additional boosting line BSL' may become a voltage of 0V, a potential difference between the word line WL and the bit line BL may become a voltage of Vdd/6, a potential difference between the boosting line BSL and the additional boosting line BSL' may become a voltage of 0V, a potential difference between the bit line BL and the boosting line BSL may become a voltage of Vdd/6, and a potential difference between the bit line BL and the additional boosting line BSL' may become a voltage of Vdd/6. As a result, a voltage corresponding to 0+0+Vdd/6+0+Vdd/6+Vdd/6, that is, a voltage corresponding to Vdd/2 may be applied to the selection element S of the half-selected memory cell MC sharing the bit line BL with the selected memory cell MC.

According to the semiconductor device of the present embodiment described above, since a voltage smaller in magnitude than the power supply voltage Vdd, for example, a voltage of Vdd/6 or –Vdd/8 is used, the power consumption of the semiconductor device may be further reduced compared to the comparative example. Despite the reduction in power consumption, the voltages applied to the selected memory cell MC, the unselected memory cell MC, and the half-selected memory cell MC in the semiconductor device of the present embodiment are same as those in the comparative example. Thus, as in the comparative example, in the semiconductor device of the present embodiment, a voltage of Vdd may be applied to the selected memory cell MC, a voltage of 0V may be applied to the unselected memory cell MC, and a voltage of Vdd/2 may be applied to the half-selected memory cell MC.

Figure 11:
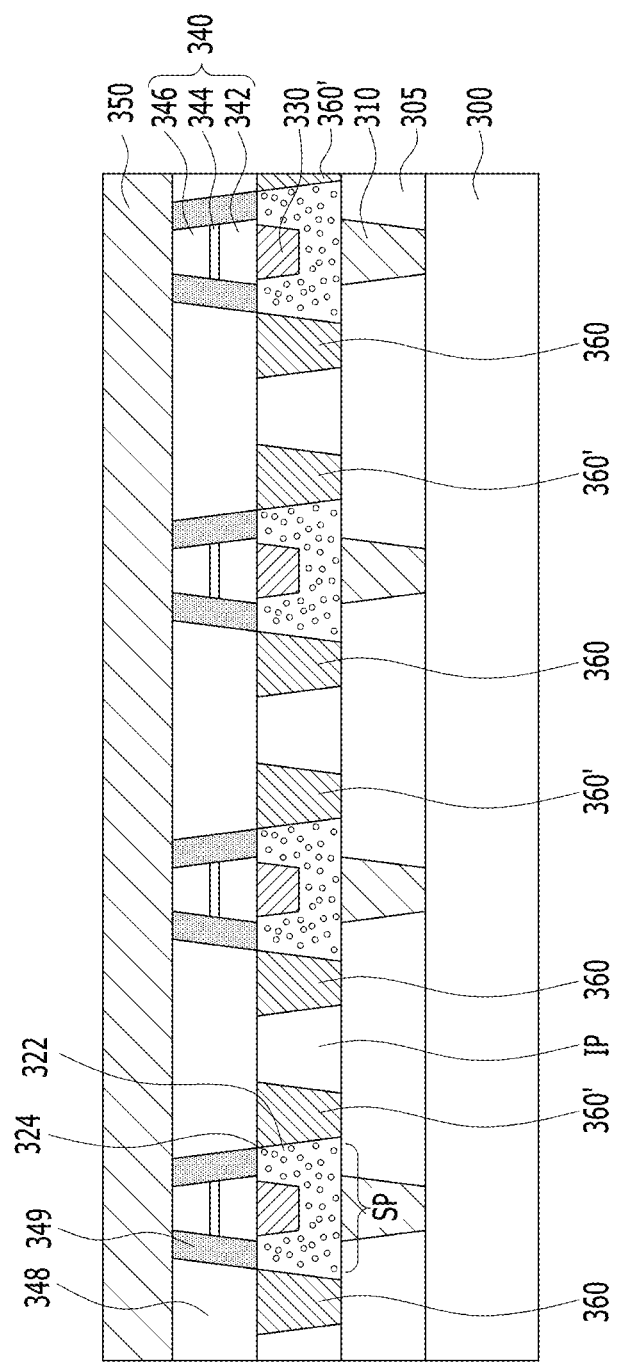
FIG. 11 is a cross-sectional view illustrating a semiconductor device according to another embodiment of the present disclosure, and a method for fabricating the same.

FIG. 11 is a cross-sectional view illustrating a semiconductor device according to another embodiment of the present disclosure, and a method for fabricating the same. As an example, a cross-sectional view of FIG. 11 illustrates the memory cells MC arranged in the second direction in the semiconductor device of FIG. 10 and the word lines WL, the boosting lines BSL, the additional boosting lines BSL', and the bit lines BL connected thereto.

Referring to FIG. 11, a plurality of word lines 310 may be arranged to be spaced apart from each other over a substrate 300. The plurality of word lines 310 may extend in a direction passing through the cross-section of this figure, for example, in a first direction. A space between the plurality of word lines 310 may be filled with a first interlayer insulating layer 305.

An insulating layer 322, an electrode layer 330, a boosting line 360, and an additional boosting line 360' may be disposed over the word lines 310 and the first interlayer insulating layer 305. Here, the insulating layer 322 may include a portion doped with a dopant 324 and a portion not doped with the dopant 324. The portion of the insulating layer 322, that is doped with the dopant 324, may be referred to as a selection element portion SP, and the portion of the insulating layer 322, that is not doped with the dopant 324, may be referred to as an insulating portion IP. A method of forming the selection element portion SP, the electrode layer 330, and the insulating portion IP may be substantially the same as described with reference to FIGS. 5A to 8B.

The boosting line 360 and the additional boosting line 360' may be formed to pass through the insulating portion IP at both sides of the selection element portion SP to respectively contact both sides of the selection element portion SP. The boosting line 360 and the additional boosting line 360' may be formed by selectively etching the insulating layer 322 to form line-type trenches parallel to each other and exposing both sides of the selection element portion SP, respectively, and then filling the trenches with a conductive material.

The variable resistance element 340 may be formed over the insulating layer 322, the boosting line 360, the additional boosting line 360', and the electrode layer 330. As an example, the variable resistance element 340 may include an MTJ structure that includes a free layer 342 having a changeable magnetization direction, a pinned layer 346 having a fixed magnetization direction, and a tunnel barrier layer 344 interposed between the free layer 342 and the pinned layer 346.

A spacer 349 including various insulating materials may be formed over the sidewall of the variable resistance element 340 to protect the variable resistance element 340. A space between the variable resistance elements 340 with the spacers 349 may be filled with a second interlayer insulating layer 348.

A bit line 350 extending in the second direction while being connected to the upper end of the variable resistance element 340 may be disposed over the variable resistance element 340 and the second interlayer insulating layer 348.

According to the above embodiments of the present disclosure, a semiconductor device capable of reducing power consumption by using a low operating voltage, and a method for fabricating the same may be provided.

Although various embodiments have been described for illustrative purposes, it will be apparent to those skilled in the art that various changes and modifications may be made based on what is disclosed in this patent document.

What is claimed is:

1. A semiconductor device comprising:
a plurality of word lines extending in a first direction;
a plurality of bit lines spaced from the plurality of word lines and extending in a second direction that is different from the first direction;

a plurality of memory cells disposed at intersections of the plurality of word lines and the plurality of bit lines, respectively, each memory cell being coupled between and electrically connected to a pair of a corresponding bit line and a corresponding word line that intersect at the memory cell and structured to include a variable resistance element configured to store data by exhibiting different resistance values and a selection element connected to the variable resistance element in series to selectively connect or disconnect the variable resistance element to the pair of the corresponding bit line and word line; and a boosting line connected to a portion of the selection element that is between one end of the selection element, which is connected to one of the word line and the bit line, and another end of the selection element, which is connected to the variable resistance element, wherein the boosting line supplies a boosting voltage to the selection element to reduce a voltage applied to the memory cell via the pair of the corresponding bit line and word line for operating the memory cell.

2. The semiconductor device according to claim 1, wherein a voltage applied to the selection element corresponds to a sum of a potential difference between the word line and the bit line, a potential difference between the word line and the boosting line, and a potential difference between the bit line and the boosting line.

3. The semiconductor device according to claim 1, wherein, when a voltage required to turn on the selection element is a first voltage, −first voltage/4, +first voltage/4, and −first voltage/4 are applied to the word line, the bit line, and the boosting line connected to the selection element of a selected memory cell, respectively, and a voltage of 0V is applied to the word line, the bit line, and the boosting line connected to the selection element of each of remaining memory cells.

4. The semiconductor device according to claim 1, wherein the boosting line extends in the first direction.

5. The semiconductor device according to claim 1, further comprising:

an additional boosting line positioned on an opposite side of the boosting line with respect to the selection element and connected to another portion of the selection element that is between one end of the selection element and another end of the selection element.

6. The semiconductor device according to claim 5, wherein a voltage applied to the selection element corresponds to a sum of a potential difference between the word line and the bit line, a potential difference between the word line and the boosting line, a potential difference between the word line and the additional boosting line, a potential difference between the bit line and the boosting line, a potential difference between the bit line and the additional boosting line, and a potential difference between the boosting line and the additional boosting line.

7. The semiconductor device according to claim 5, wherein, when a voltage required to turn on the selection element is a first voltage, a voltage of 0V, +first voltage/6, −first voltage/8, and −first voltage/8 are applied to the word line, the bit line, the boosting line, and the additional boosting line connected to the selection element of a selected memory cell, respectively, and a voltage of 0V is applied to the word line, the bit line, the boosting line, and the additional boosting line connected to the selection element of each of remaining memory cells.

8. The semiconductor device according to claim 5, wherein the boosting line and the additional boosting line extend in the first direction.

9. A semiconductor device comprising:
a substrate;
a plurality of word lines disposed over the substrate and extending in a first direction;
a plurality of memory cells arranged in the first direction and overlapping each of the plurality of word lines, each memory cell including a selection element and a variable resistance element that are stacked in a vertical direction;
a boosting line in contact with a portion of a side surface of the selection element; and
a plurality of bit lines disposed over the memory cells and extending in a second direction intersecting the first direction.

10. The semiconductor device according to claim 9, wherein the selection element includes an insulating layer and a dopant doped in the insulating layer.

11. The semiconductor device according to claim 10, wherein the dopant is configured to form a trap site capable of trapping a conductive carrier in the insulating layer.

12. The semiconductor device according to claim 10, wherein a remaining portion of the side surface of the selection element other than the portion of the side surface of the selection element is surrounded by the insulating layer.

13. The semiconductor device according to claim 9, further comprising:

an electrode layer having a side surface and a lower surface, and wherein at least a portion of the side surface and the lower surface of the electrode layer are surrounded by the selection element.

14. The semiconductor device according to claim 13, wherein the variable resistance element is disposed over the electrode layer to overlap the electrode layer.

15. The semiconductor device according to claim 9, wherein the boosting line extends in the first direction.

16. The semiconductor device according to claim 10, wherein a thickness of the boosting line is less than or equal to a thickness of the insulating layer.

17. The semiconductor device according to claim 9, further comprising:

an additional boosting line extending in a direction parallel to the boosting line and being in contact with another portion of the side surface of the selection element on an opposite side of the boosting line with respect to the selection element.

18. The semiconductor device according to claim 17, wherein, except for the portion and the another portion of the side surface of the selection element, a remaining portion of the side surface of the selection element is surrounded by an insulating layer.

19. The semiconductor device according to claim 17, wherein the boosting line and the additional boosting line extend in the first direction.

20. The semiconductor device according to claim 18, wherein a thickness of each of the boosting line and the additional boosting line is less than or equal to a thickness of the insulating layer.

21. A method for fabricating a semiconductor device, comprising:

forming a plurality of word lines extending in a first direction, over a substrate;

forming a plurality of selection elements arranged in the first direction to overlap each of the plurality of word lines;

forming a boosting line in contact with a portion of a side surface of the selection element on one side of the selection element;

forming a variable resistance element over the selection element; and forming a plurality of bit lines disposed over the variable resistance element and extending in a second direction intersecting the first direction.

22. The method according to claim 21, wherein the forming the selection element comprises:

forming an insulating layer over the plurality of word lines;

forming a hole by selectively etching the insulating layer to a depth smaller than a thickness of the insulating layer;

doping a dopant into an upper portion of the insulating layer and a portion of the insulating layer that is positioned below the hole;

removing the upper portion of the insulating layer; and filling the hole with a conductive material.

23. The method according to claim 22, wherein the forming the boosting line comprises:

forming a trench by etching the insulating layer so that one side of the dopant-doped portion of the insulating layer is exposed; and filling the trench with a conductive material.

24. The method according to claim 22, wherein the variable resistance element is formed to overlap the conductive material.

25. The method according to claim 21, further comprising:

forming an additional boosting line in contact with another portion of the side surface of the selection element on another side positioned opposite to the one side of the selection element.

26. The method according to claim 25, wherein the forming the selection element comprises:

forming an insulating layer over the plurality of word lines;

forming a hole by selectively etching the insulating layer to a depth smaller than a thickness of the insulating layer;

doping a dopant into an upper portion of the insulating layer and a portion of the insulating layer that is positioned below the hole;

removing the upper portion of the insulating layer; and filling the hole with a conductive material.

27. The method according to claim 26, wherein the forming the boosting line and the forming the additional boosting line comprises:

forming trenches by etching the insulating layer so that one side and another side of the dopant-doped portion of the insulating layer are exposed; and filling the trenches with a conductive material.

\* \* \* \* \*